(12) United States Patent
Molesky et al.

(10) Patent No.: US 7,421,665 B2
(45) Date of Patent: Sep. 2, 2008

(54) NODE SCROLLERS

(75) Inventors: Lory Dean Molesky, Lexington, MA (US); Gopalan Arun, Nashua, NH (US); Carl J. Evankovich, Nashua, NH (US); David Mor, Merrimack, NH (US)

(73) Assignee: Oracle International Corporation, Redwood Shores, CA (US)

( * ) Notice: Subject to any disclaimer, the term of this patent is extended or adjusted under 35 U.S.C. 154(b) by 443 days.

(21) Appl. No.: 11/029,519

(22) Filed: Jan. 5, 2005

(65) Prior Publication Data

US 2006/0059435 A1 Mar. 16, 2006

Related U.S. Application Data

(60) Provisional application No. 60/605,823, filed on Aug. 31, 2004.

(51) Int. Cl.
  *G06F 3/048* (2006.01)
(52) U.S. Cl. .................. 715/854; 715/805; 715/786; 715/833; 715/804; 715/830
(58) Field of Classification Search ......... 715/853–855, 715/781–788, 802–805, 817, 830, 833, 764; 707/104.1
See application file for complete search history.

(56) References Cited

U.S. PATENT DOCUMENTS

| | | | | |
|---|---|---|---|---|
| 5,835,085 A * | 11/1998 | Eick et al. | ................... | 715/853 |
| 6,216,134 B1 * | 4/2001 | Heckerman et al. | ...... | 707/104.1 |
| 6,738,787 B2 * | 5/2004 | Stead | ....................... | 707/104.1 |
| 6,801,229 B1 * | 10/2004 | Tinkler | ........................ | 715/853 |
| 6,901,555 B2 * | 5/2005 | Hida et al. | ................... | 715/734 |
| 2002/0167551 A1 * | 11/2002 | Steele et al. | ................. | 345/853 |
| 2003/0007002 A1 * | 1/2003 | Hida et al. | ................... | 345/734 |
| 2003/0079182 A1 * | 4/2003 | Hofmann | ..................... | 715/513 |
| 2004/0150644 A1 * | 8/2004 | Kincaid et al. | .............. | 345/440 |
| 2004/0169688 A1 * | 9/2004 | Burdick et al. | .............. | 345/854 |
| 2005/0114795 A1 * | 5/2005 | Beaudoin | ..................... | 715/854 |

OTHER PUBLICATIONS

Product Datasheet, Inxight VizServer, www.inxight.com, copyright© 2004.

* cited by examiner

*Primary Examiner*—Tadeese Hailu
(74) *Attorney, Agent, or Firm*—Michele Liu Baillie; Gordon E. Nelson

(57) ABSTRACT

Techniques employed in displays of graphs with large numbers of nodes for viewing details of an area of interest while preserving context. The techniques take advantage of parent-child and sibling relationships. Sibling nodes and children of sibling nodes are displayed in rows. The center of interest is at the center of a row and nodes at the ends of the rows overlap. A parent node may have a node scroller associated with it for viewing the parent's child nodes one page of nodes at a time. The node scroller includes paging buttons and may also include a scroll bar with a slider. The node scroller may be displayed on the parent node itself or on the links connecting the parent node to the page of children currently being displayed. Also disclosed are details of the implementation of a preferred embodiment of the node scroller and details of an application programmer's interface (API) for creating and manipulating node scrollers.

50 Claims, 16 Drawing Sheets

1401 {
  public PagingDataSource() — 1407, 1409, 1411
  Create an instance of PagingDataSource.
}

1403 {
  public PagingDataSource(DataProvider provider)

Create an instance of PagingDataSource using the given DataProvider. The DataProvider is used to load portions of the network on demand. It will be called internally from the DefaultDataSource once for each node.

Parameters:
     provider - the data provider to load the network from.
}

1405 {
  public TopologyEventListener createTopologyListener(TopologyObject top)

Create a paging data source listener. The listener that is returned automatically advances the page numbers of the node that is clicked on.

Returns:
     the paging data source listener. — 1413
}

Fig. 14

1501 {
public int getPageNumber(Node n)

Get the page number of the given node.

Parameters:
   n - the node to get the page number of.
Returns:
   the page number the node is set to
}

1503 {
public int getPageSize()

Get the size of each page of nodes returned.

Returns:
   the page size.
}

1505 {
public int getPagingArrowStyle()

Get the style of paging arrows.

Returns:
   constant defining which arrow style is in use
See Also:
   ARROWS_ON_CHILDREN, ARROWS_ON_NODE
}

1507 {
public boolean hasPagingArrowsAdded(Node n)

Return whether the given node had a paging arrow added to it. This will only ever return true if the paging arrow style is ARROWS_ON_NODE.

Parameters:
   n - the node to check.
Returns:
   whether the node had a paging arrow added to it.
}

Fig. 15

1601
```
public void setPageNumber(Node n,
                int page)

Set the page number of the given node.

Parameters:
    n - the node to set the page number of.
    page - the page number to set the node to.
```

1603
```
public void setPageSize(int pageSize)

Set the size of each page of nodes returned.

Parameters:
    pageSize - the page size.
```

1605
```
public void setPagingArrowStyle(int arrowStyle)

Set the style of paging arrows.

Parameters:
    arrowStyle - constant defining which arrow style to
use
    See Also:
        ARROWS_ON_CHILDREN, ARROWS_ON_NODE
```

Fig. 16

NODE SCROLLERS

CROSS REFERENCES TO RELATED APPLICATIONS

This patent application claims priority from U.S. provisional patent application 60/605,823, Making and viewing nodes in a graph, filed Aug. 31, 2004, which has the same inventors as the present patent application. The entirety of 60/605,823 is incorporated by reference into the present patent application for all purposes.

BACKGROUND OF THE INVENTION

1. Field of the Invention

The invention relates to the interactive display of graphs with nodes that have a large number of children.

2. Description of Related Art

Graphs: FIG. 1

One of the most useful ways of visually representing information is the graph. Mathematically, a graph is a set of nodes that may or may not be connected by arcs. The nodes represent entities and the arcs represent relationships between the entities. FIG. 1 shows an example graph 101 which represents a hierarchy consisting of the generic term textures and five specific textures. The hierarchy is represented by means of nodes 103 and arcs 107 connecting the nodes. Each node represents a term and the arcs indicate that nodes 103(2 ... 7) represent species of the generic term represented by node 103(1). In the following discussion, the arcs will be termed links. Each node 103 has a label 105. The kind of relationship between the nodes shown in FIG. 101 is termed a tree 109, with node 103(1) being the root of the tree and nodes 103(2 ... 7) being the leaves of the tree. Node 103(1) is further termed the parent of nodes 103(2 ... 7) and those nodes are termed the children of node 103(1) and the siblings of each other. Of course, a node may have more than one level of descendants; if node 107(2), for example, has children, those children are grandchildren of node 103(1).

Displaying Graphs with Large Numbers of Nodes: FIG. 2

Graphs may have very large numbers of nodes. Such graphs will be termed in the following large graphs. For designers of systems which employ large graphs, the display of such graphs presents major problems. The display devices employed by computer users are typically not large enough to legibly display all of the nodes of a large graph at once and the display of only part of the graph in legible form leaves that part without context. Two techniques have been used to overcome the problems of displaying large graphs:

zooming, in which the user can control the scale at which the portion of the graph he or she is interested in appears in the display; and distortion of the graph, with the portion of the graph at the center of the display being increased in size and the portions of the graph at the edges of the display being decreased in size.

The technique of zooming is too well known to require further explanation; the drawback of zooming is that a zoom to a larger scale typically results in a loss of context for the portion of the graph displayed at the larger scale.

FIG. 2 presents an example of a distortion technique employed by Inxight Software Inc., Sunnyvale, Calif., in their Inxight VizServer™ product. which is described in a datasheet available on Dec. 3, 2004 at www.inxight.com/products/vizserver/. In distortion technique 201, a graph 202 is displayed as if it were drawn on a surface with a hyperbolic or parabolic curvature, with the part of the graph which is currently the center of interest at the apex of the hyperbolic or parabolic surface. In FIG. 2, the current center of interest is node 205. The further away a portion of the graph is from the apex, the smaller its nodes and its links, until finally, nothing is shown but links, as may be seen at 207 and 209. When the center of interest shifts to a different area of the graph (typically because the user has moved the cursor to another point in the display), the graph is displayed on the curved surface such that the new center of interest is now at the apex of the surface. Because distortion technique 201 increases the scale of only the portion of the graph at the current center of interest and progressively decreases the scale of the rest of the graph as the edge of the display area is approached, it does a better job of maintaining the context of the portion of the graph that is displayed at a larger scale than does simple zooming.

A problem that is common to both zooming and distortion, however, is that both techniques operate independently of the node and link structure of the graph. It is this structure, however, which is the reason for the graph's existence and which contains most of the information in the graph. What is needed is techniques which not only permit display of a portion of a graph with more detail than another portion, but which do so in ways which take the node and link structure of the graph into account. Providing such techniques is an object of the present invention.

SUMMARY OF THE INVENTION

In one aspect, the object of the invention is attained by a node scroller which permits a user to interactively scroll through the children of a parent node that is displayed in a graph. The node scroller includes a node scroller that is associated with the parent node in the display and a list of the parent node's child nodes in memory that is accessible to the interactive display device that is producing the display. The interactive display device responds to a user input to the node scroller by determining a set of child nodes and displaying the set that has thus been determined. Elements of the node scroller may include up and down arrows and/or a slider. An input to an element specifies a position in the list of child nodes and the set of nodes that is displayed is made up of nodes from the neighborhood of the position.

In one version of the invention, the list of child nodes is divided into a sequence of pages and an input to an up or down arrow gets a next page in the sequence relative to a current page. The input to the up arrow gets the previous page in the sequence and the input to the down arrow gets the next page in the sequence. An input to the slider indicates a position in the list. In some embodiments, what is displayed is the page of nodes containing the position; in others, it is a set of nodes centered on the position indicated by the slider.

A node scroller may be positioned on the parent node or on the links connecting the parent node and the set of child nodes that is currently being displayed. A node scroller which is positioned on the parent node is termed a parent node scroller, and one that is positioned on the links is called a link node scroller. One version of a parent node scroller includes only up and down arrows; another includes the up and down arrows and a scrollbar. In this version, the scrollbar is hidden behind the parent node until a user input activates the node scroller, at which point the scrollbar is displayed in front of the parent node. A version of the link scroller includes a scrollbar that stretches across the links it is positioned on and up and down arrows at the ends of the scrollbar.

Other objects and advantages will be apparent to those skilled in the arts to which the invention pertains upon perusal of the following Detailed Description and drawing, wherein:

BRIEF DESCRIPTION OF THE DRAWING

FIG. 14 shows a first part of the API for node scrollers;

FIG. 15 shows a second part of the API for node scrollers; and

FIG. 16 shows a third part of the API for node scrollers.

Figure 1:
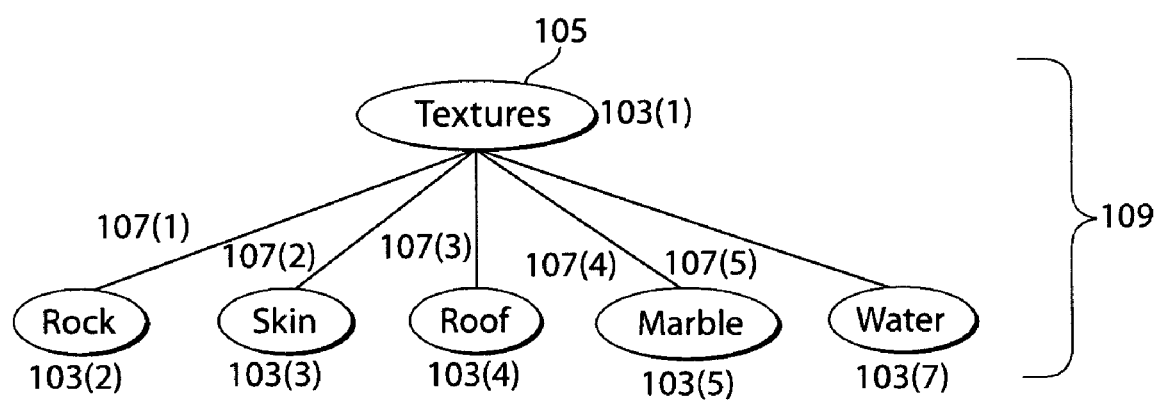
FIG. 1 is a display of a hierarchical graph.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin with an overview of two versions of the node scroller as it appears in a display of a graph, will then describe a data structure that is used to represent the invention in a preferred embodiment, and will finally disclose an application programmer's interface that is employed in the preferred embodiment to manipulate the data structure.

Figure 3:
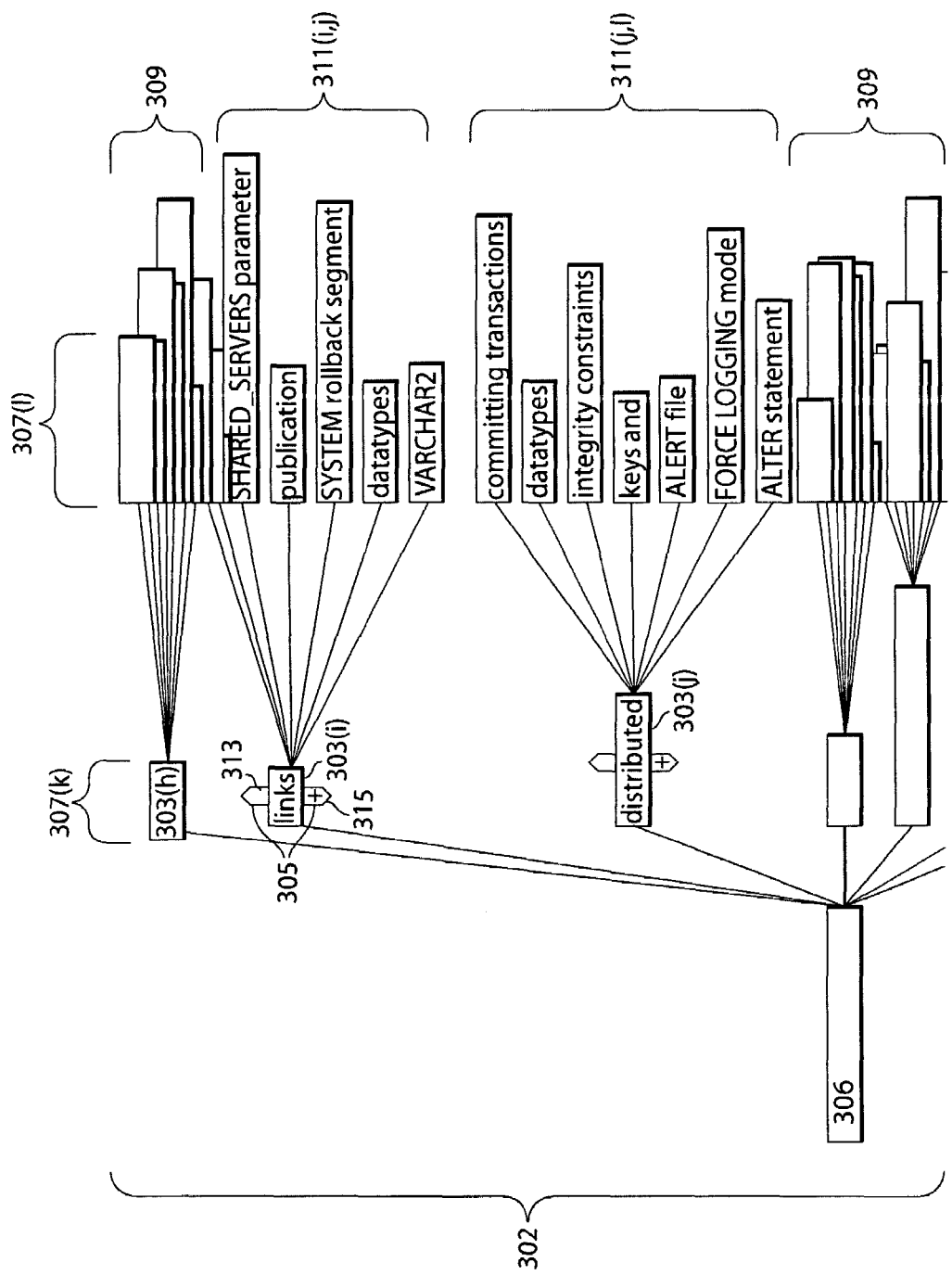
FIG. 3 shows a technique for displaying a large graph which takes the node and link structure of the graph into account.
Figure 4:
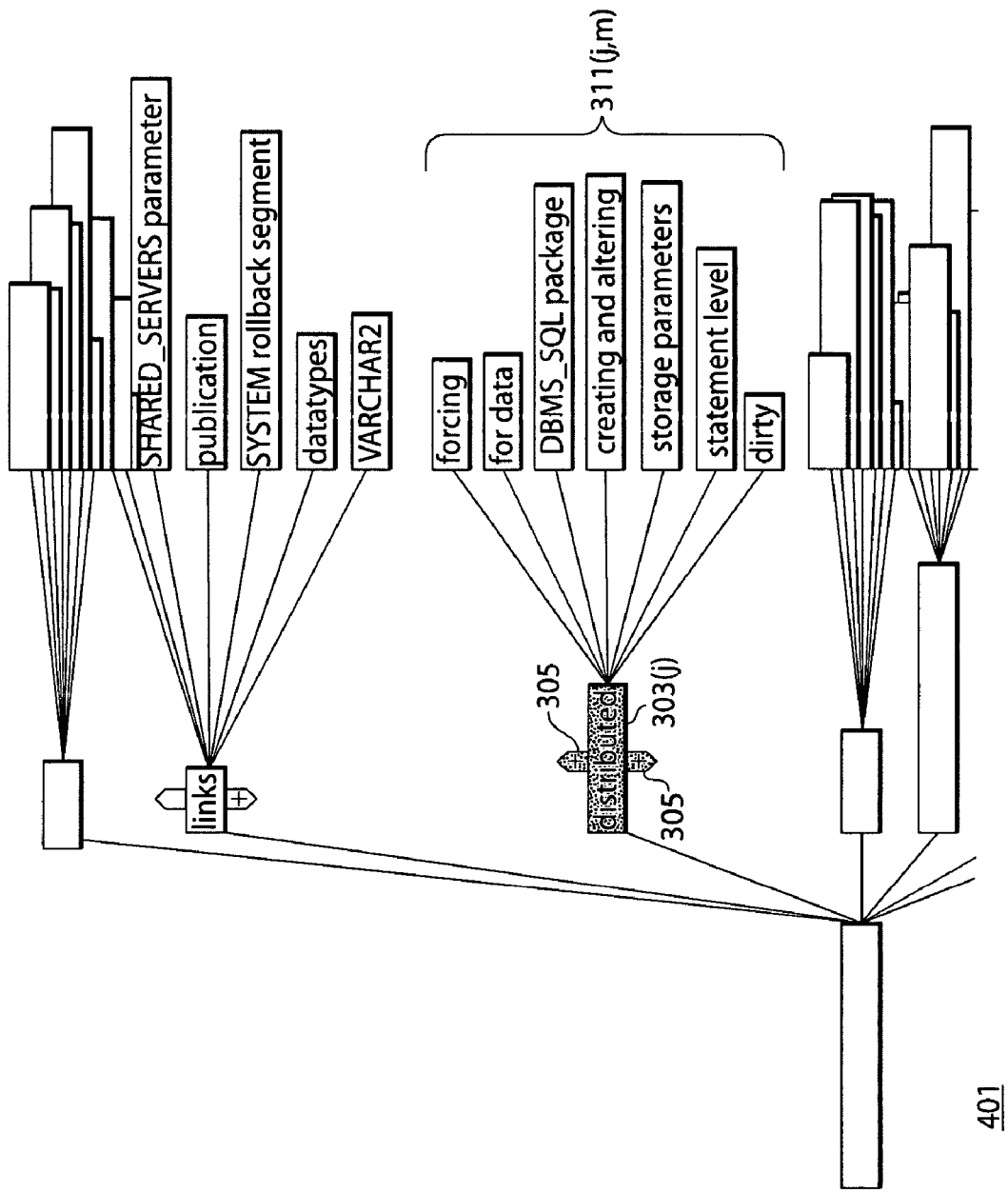
FIG. 4 is a first view showing how a first version of a node scroller works.
Figure 5:
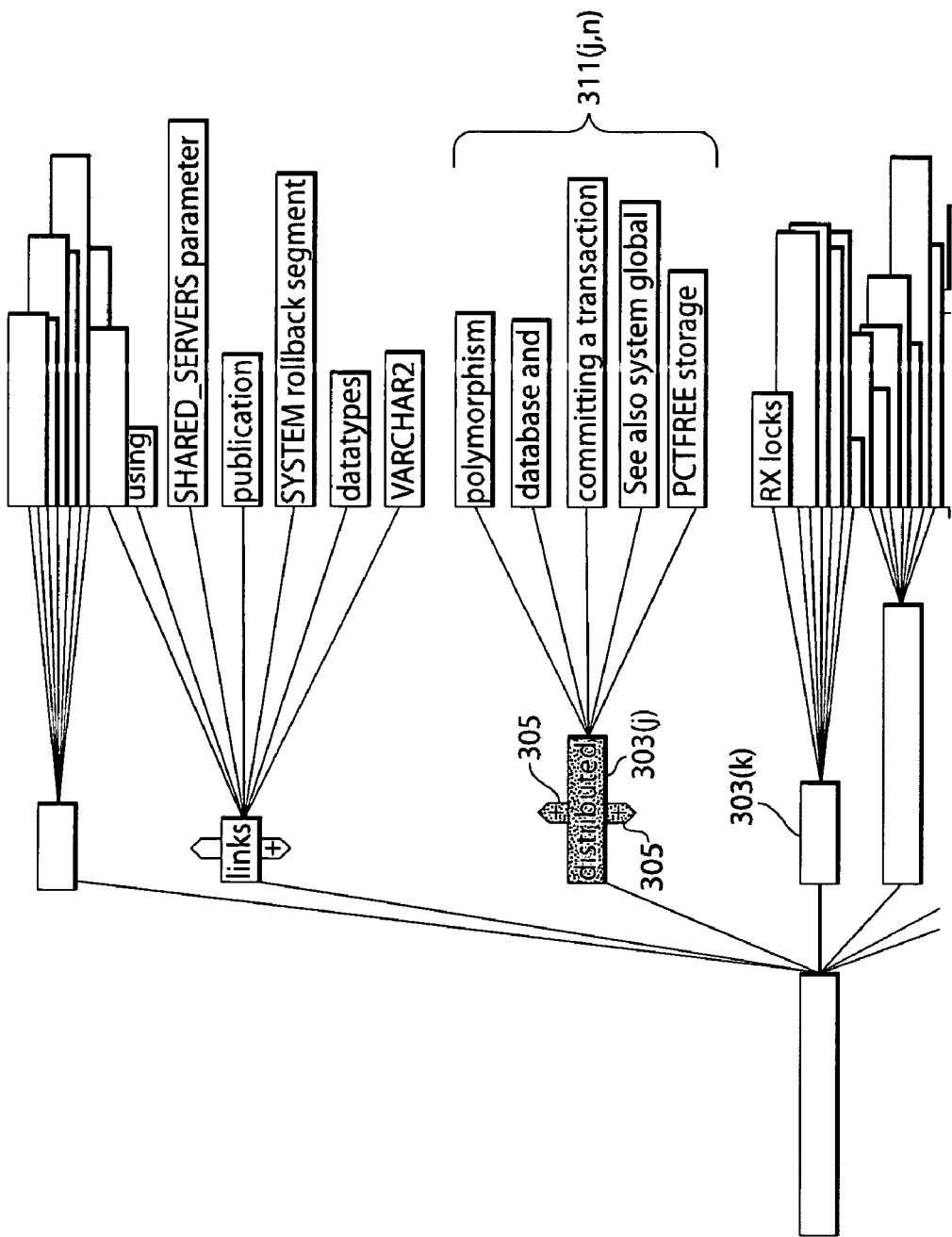
FIG. 5 is a second view showing how the first version works.

Overview of a First Embodiment of the Node Scroller: FIGS. 3-5

FIGS. 3 through 5 show a portion of a graph that is being displayed using techniques for displaying an area of particular interest in the graph at a larger scale while preserving context and taking advantage of the link and node structure of the graph. Beginning with display 301 in FIG. 3, the portion 302 of the graph being displayed is a hierarchy of nodes 303 with a root node 306 and details of two levels of nodes: level 307($k$), which is made up of children of parent node 306, and level 307($l$), which is made up of grandchildren of parent node 306. All of the visible nodes in a level are displayed in a single row. The center of interest is at the center of display 301, and the more distant a node in a row is from the center of interest, the less detail is shown. In particular, distant nodes are no longer labeled and may also overlap each other, as shown at 309. In a preferred embodiment, only the children of a node at the center of interest are shown; thus, here, where nodes 303($i$ and $j$) are at the center of interest, only the nodes at level 307($k$) are shown as having children.

The children of the nodes at the center of interest are not shown in their entirety, but only one page 311 at a time. Thus, the page displayed at 311($i,j$) is page (j) of the children of node 303($i$). To see the next page up or the next page down, one employs node scroller 305 on a node at the center of interest. The version of the node scroller shown at 305 is made up of an up arrow 313 above the node and a down arrow 317 below the node. To go to the next page up of the children, one clicks on the up arrow; to go to the next page down, one clicks on the down arrow; the presence of a + in the arrow indicates that there are more pages in the direction of the arrow. Thus, in node 303($i$), node scroller 305 indicates that the page of nodes shown at 311($i,j$) is the first page of nodes. In a preferred embodiment, a node scroller 305 appears on a node only when the node is included in the center of interest. In a preferred embodiment, a node is included when the pointing device passes over the node. A node ceases belonging to the center of interest when it is too distant from the node over which the pointing device has most recently passed.

Continuing with FIG. 4, that figure shows display 401, which is the display that appears after a user has activated node 303($j$) (indicated by the change in shading) and clicked on down arrow 315 of node scroller 305 to move one or more pages of nodes down. As may be seen by comparing page of nodes 311($j,m$) in FIG. 4 with page 311($j,l$) in FIG. 3, the child nodes that appear in page 311($j,m$) are different from those that appear in page 311($j,l$). The fact that there are + signs in both arrows of the node scroller indicate that there are pages both above and below page 311($j,m$).

FIG. 5 shows display 501, which appears after the user has clicked down on node 303($j$)'s node scroller 305 until the last page 311($j,n$) of child nodes has been reached. That it is the last page is indicated by the lack of a + sign in the node scroller's bottom arrow. Last page 311($j,n$) contains fewer nodes than the other pages (5 instead of 7) and display 507 adjusts to the fact that less vertical space is required for last page 311($j,n$) by showing more of the nodes in page 311($i,j$) and the first node in the first page of the children of node 303($k$).

Overview of a Second Embodiment of the Node Scrollers. FIGS. 6-11

Figure 6:
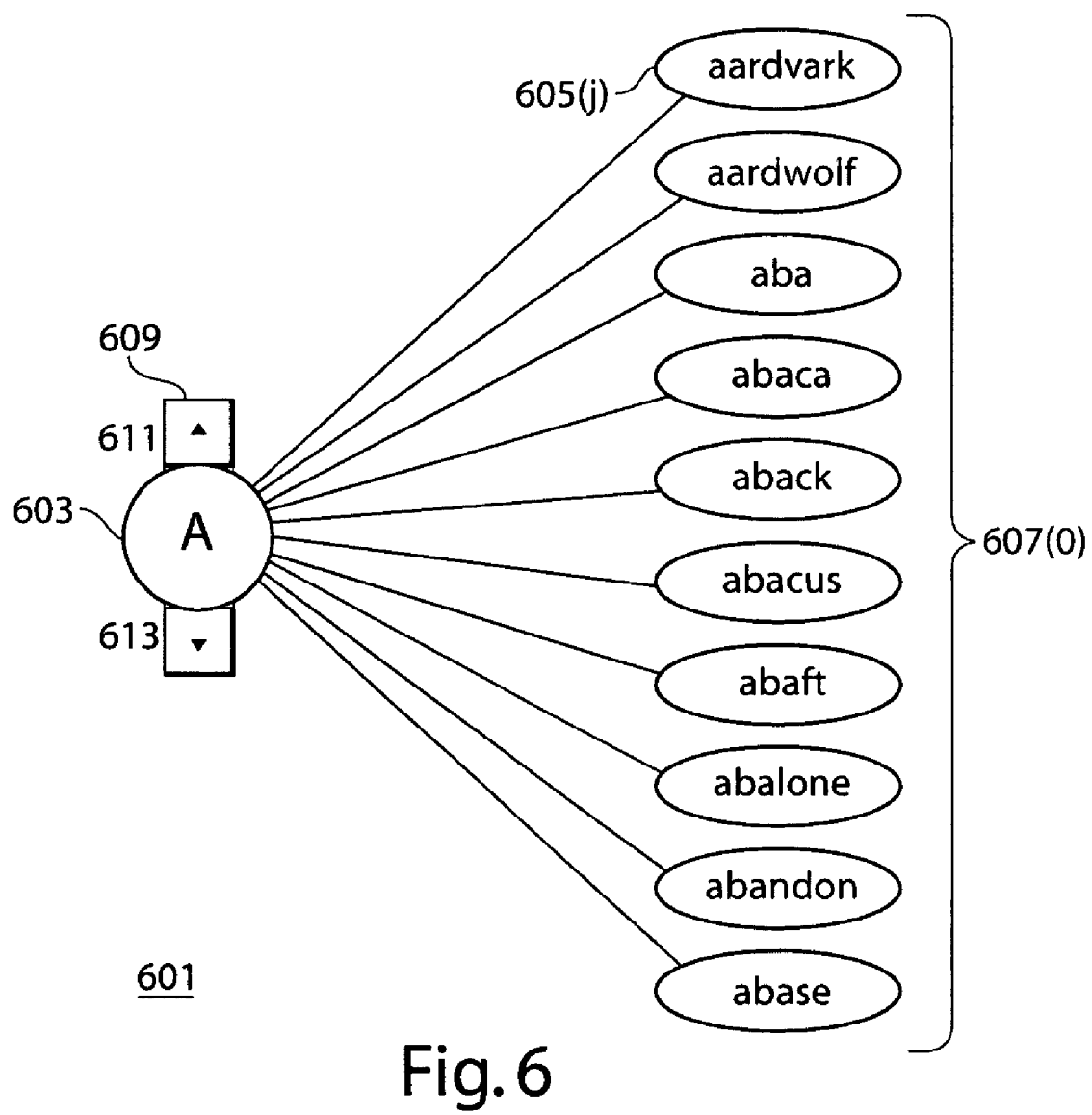
FIG. 6 shows a second version of a node scroller on a node.

FIG. 6 is a first view of a second embodiment of the node scrollers. Shown in FIG. 6 is a portion of a graph 601 that includes a parent node 603 and a number of child nodes 605, one of which is shown as child node 605($j$). Shown at 607(0) is the first page of the child nodes 605 belonging to parent node 603. Accompanying parent node 603 is an inactive parent node scroller 609; inactive parent node scroller 609 appears in the display to be behind parent node 603; only a button 611 with an up arrow and a button 613 with a down arrow show above and below parent node 603.

Figure 7:
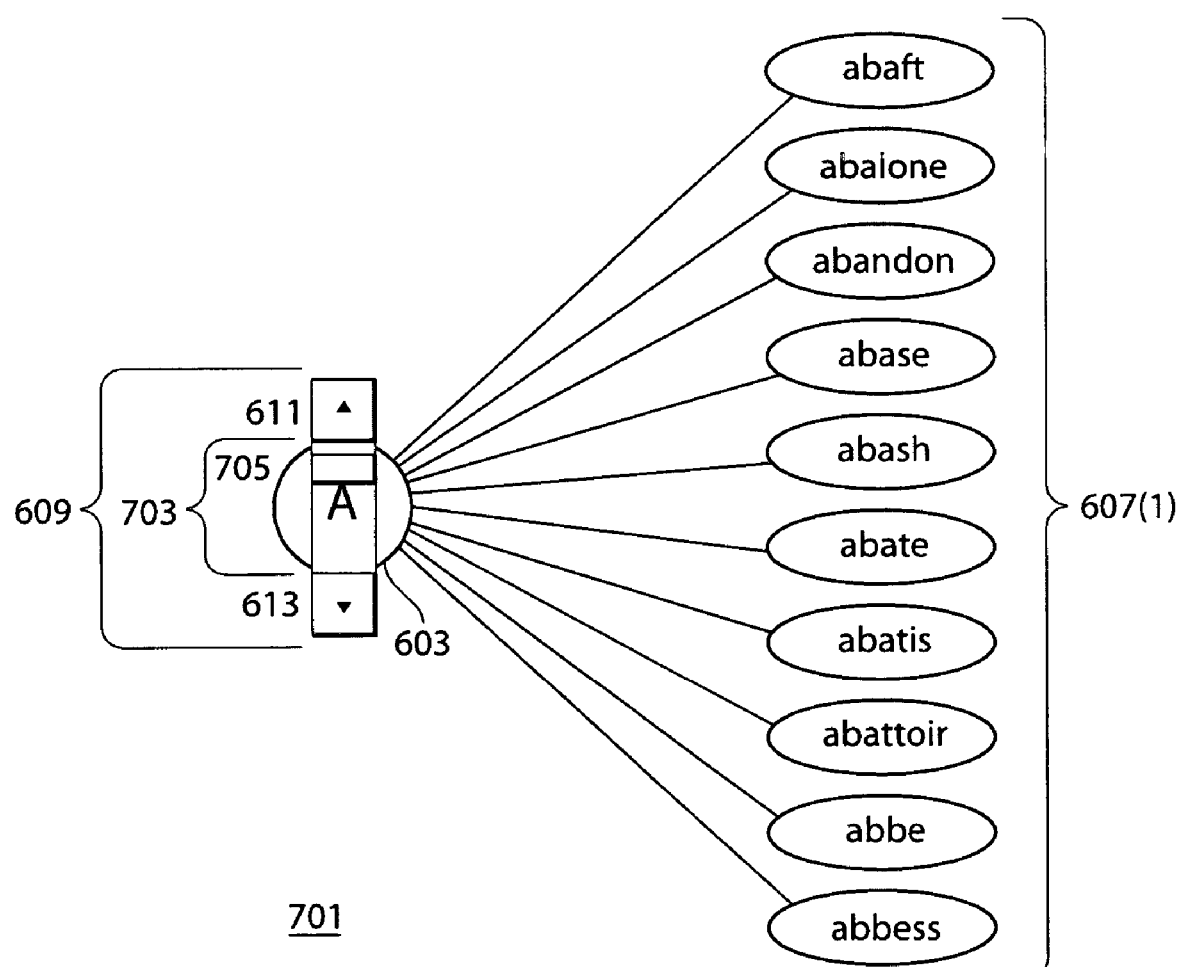
FIG. 7 shows the version of the node scroller of FIG. 6 when it has been activated.

FIG. 7 shows at 701 what happens when a user passes a pointing device over on button 611 or button 613 and thereby activates parent node scroller 609. Parent Node scroller 609 now appears in the display to be in front of parent node 603 and is seen to consist of four parts: buttons 611 and 613, which are connected by scroll bar 703, and slider 705, which moves vertically on scroll bar 703. When parent node scroller 609 is activated, a user may employ buttons 611 and 613 or slider 705 to select pages 607 of the child nodes 605 of parent node 603 for display. When the user clicks on button 611, the next page up from the page of nodes currently being displayed is selected; when the user clicks on button 613, the next page down from the current page is selected. Here, the user has clicked on next page down button 613 and the next page of child nodes, page 607(1) has appeared. As can seen by the fact that slider 705 is not at the top of slider 703, the position of slider 705 in scrollbar 703 corresponds to the position of the current page in the set of pages. When the user moves slider 705, a page 607 of nodes corresponding to the current position of slider 705 in scrollbar 713 appears. In a presently preferred embodiment, moving slider 705 merely selects the page of nodes that corresponds most closely to the current position of the slider; in other embodiments, the position of slider 705 may indicate a set of child nodes whose middle node corresponds to the position of slider 705.

Figure 8:
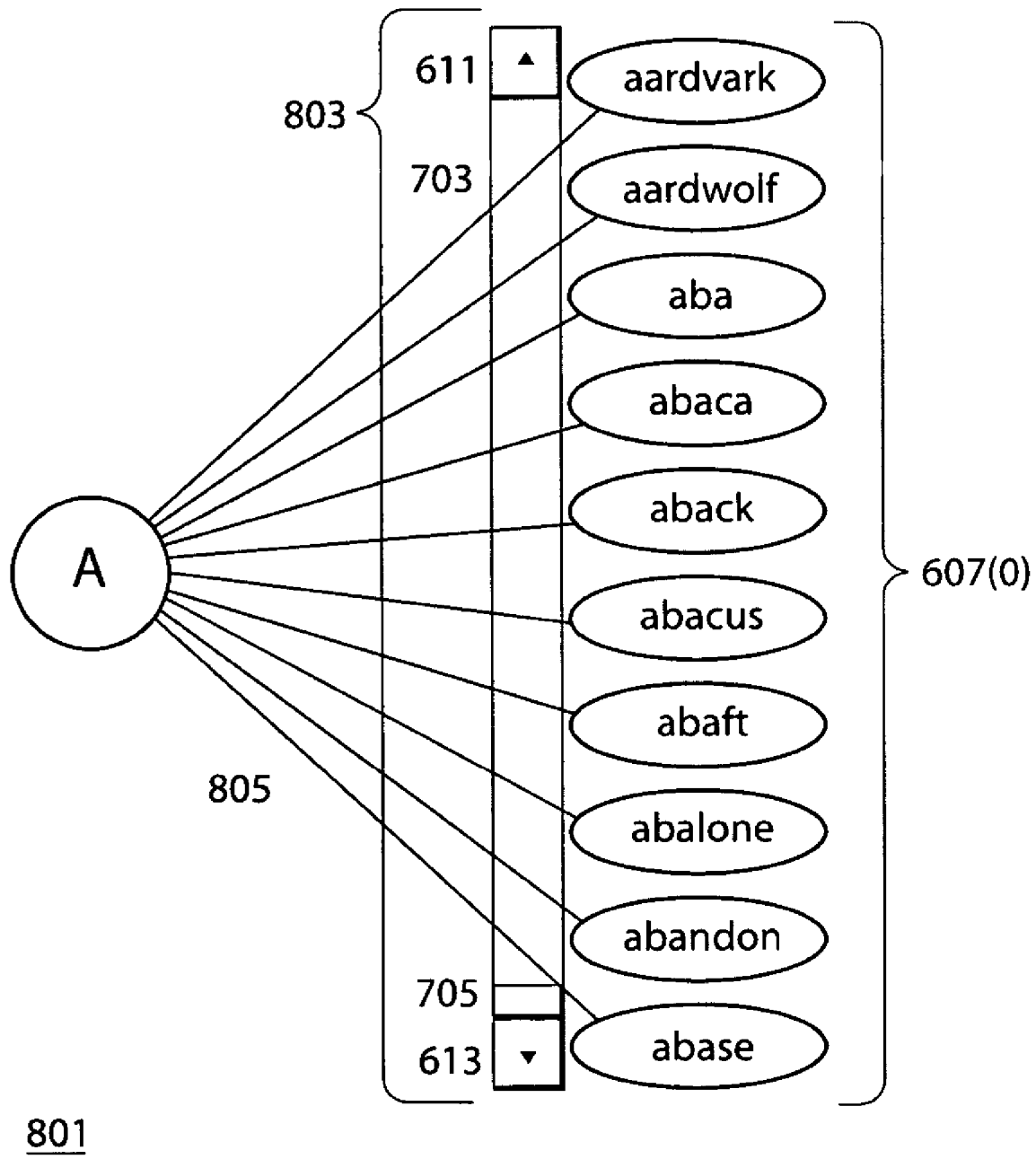
FIG. 8 shows the second version of the node scroller in a first position on the links instead of on the node.
Figure 9:
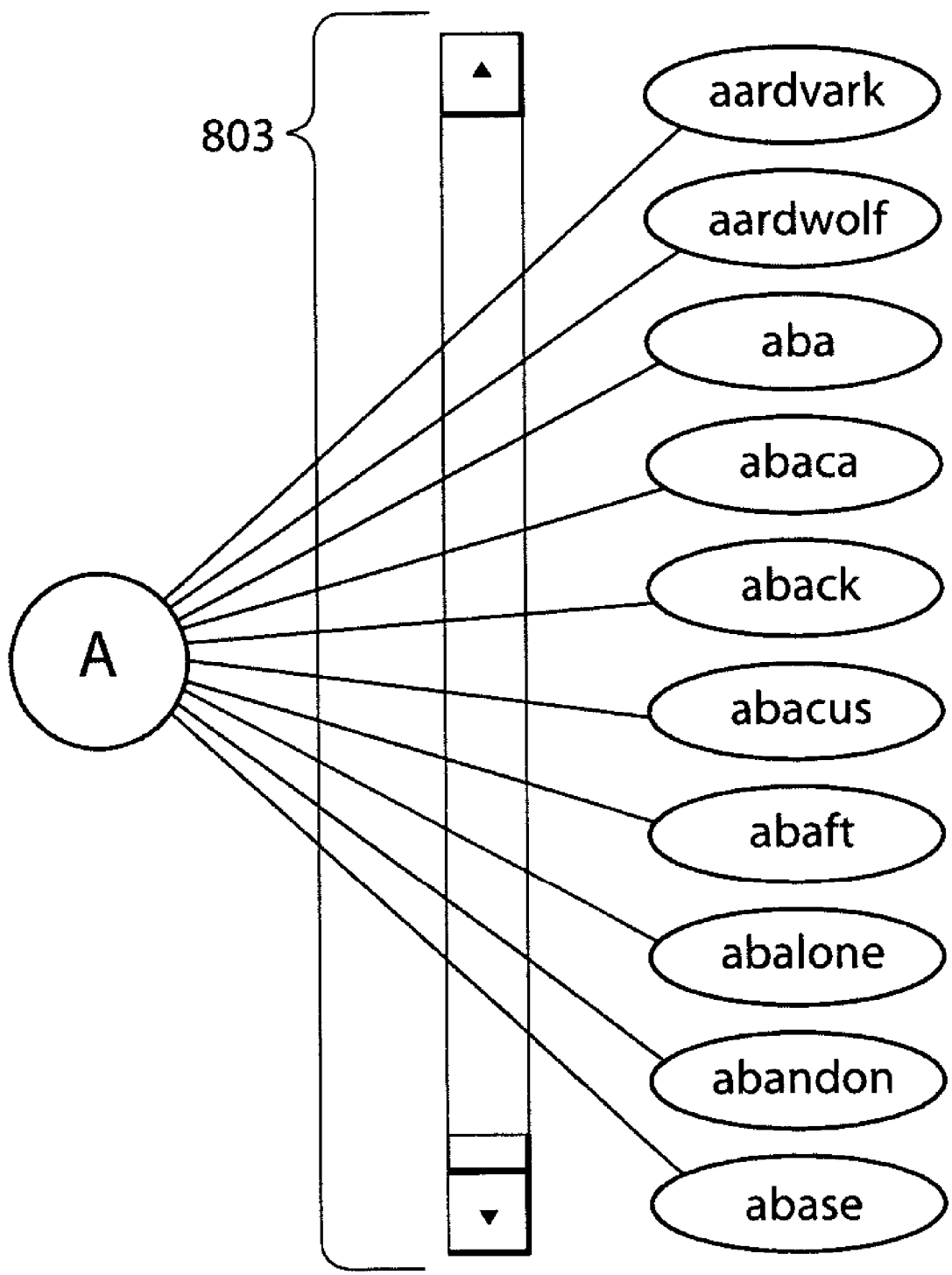
FIG. 9 shows the second version of the node scroller in a second position on the links.
Figure 10:
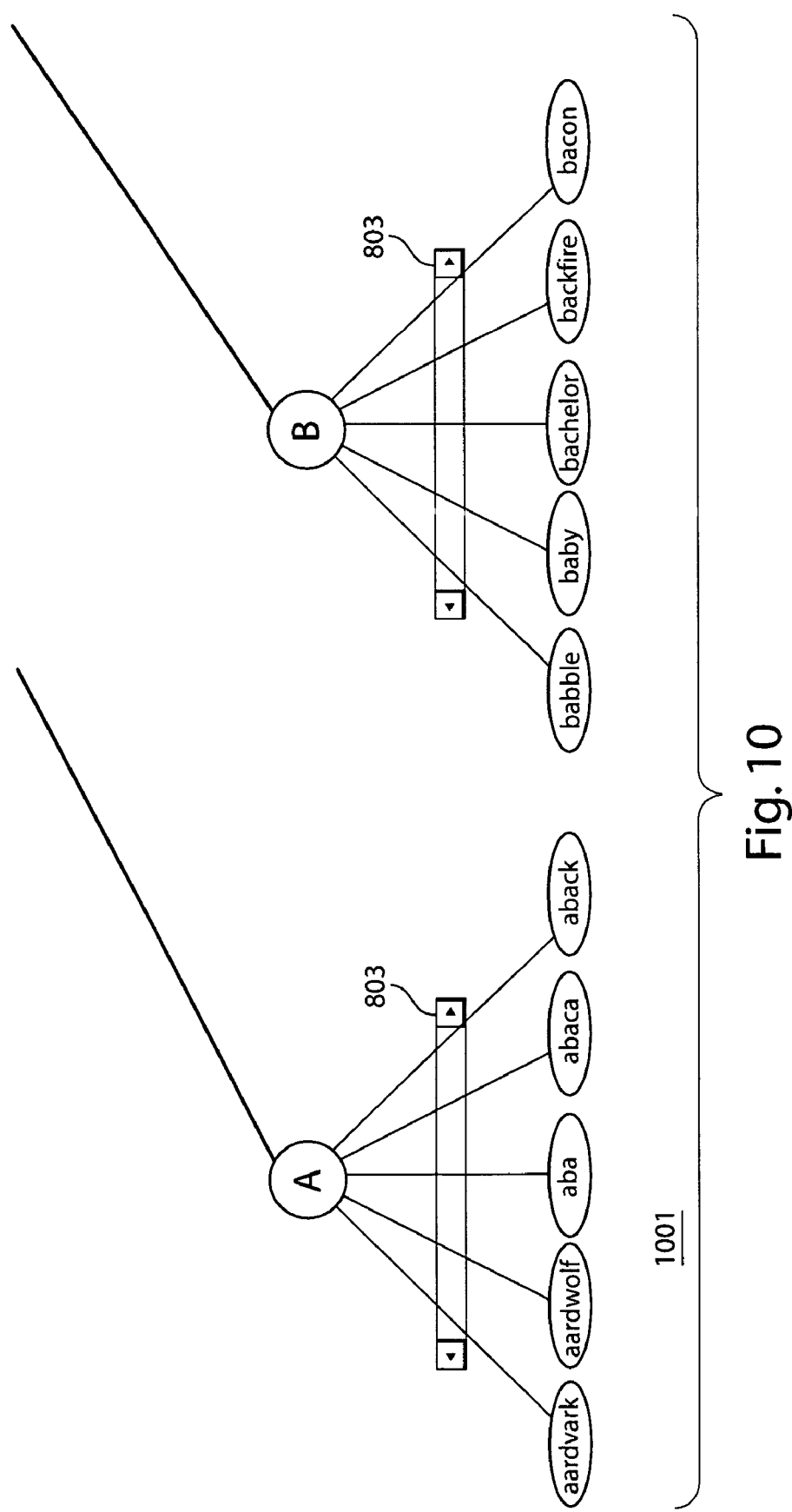
FIG. 10 shows vertically-arranged nodes with node scrollers on their links.
Figure 11:
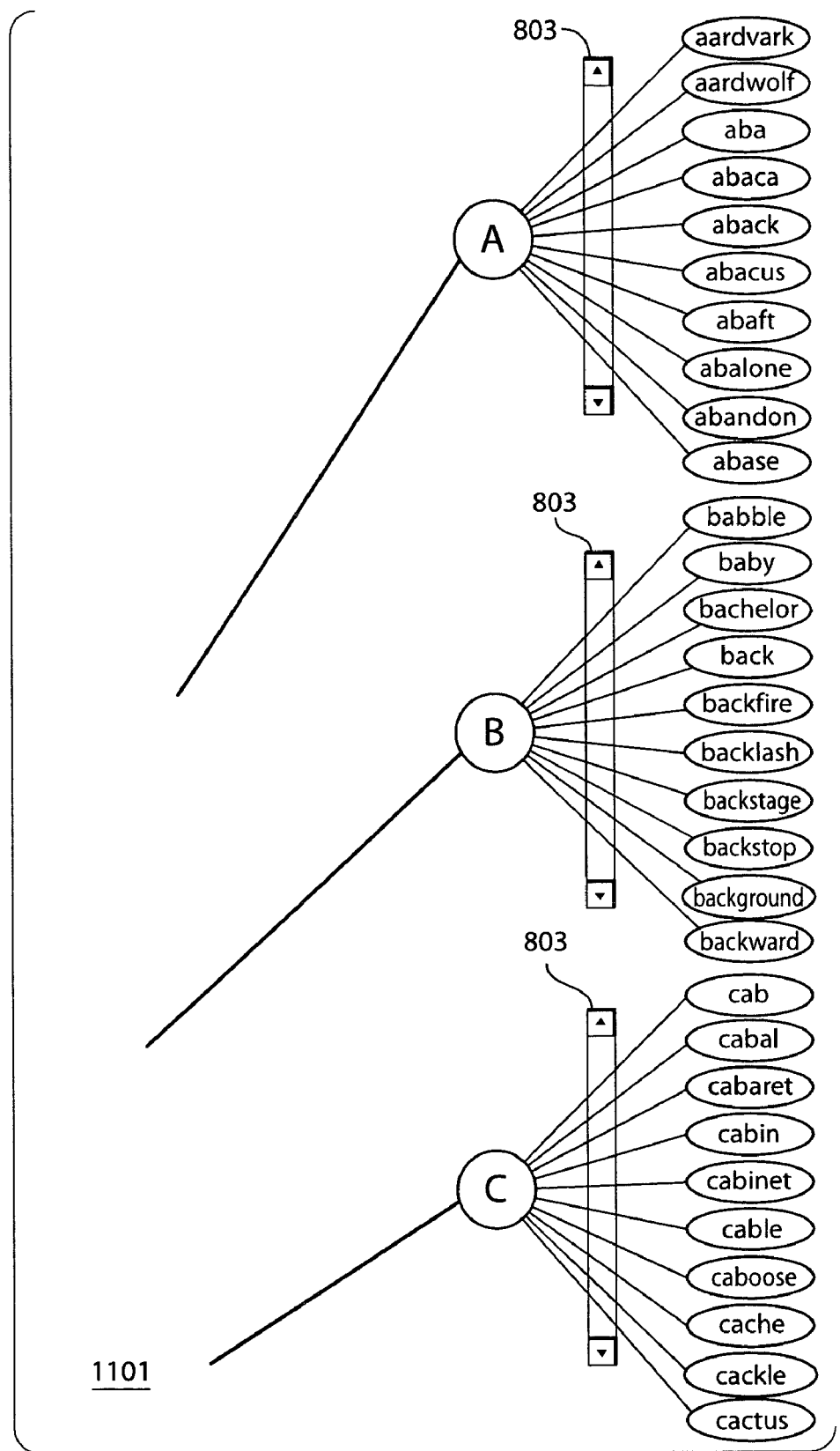
FIG. 11 shows horizontally-arranged nodes with node scrollers on their links.

FIG. 8 shows at 801 a node scroller 803 which is associated with the links 805 connecting parent node 603 with the current page 611 of child nodes. Such a node scroller will be termed in the following a link node scroller. Link node scroller 803 has the same parts and works in the same manner as activated slider 609; the only difference is that it positioned on links 805 to a page of children of parent node 609 instead of on parent node 603 itself. At present, the first page 607(0) of child nodes is showing. To see the second and further pages, the user moves slider 705 up scrollbar 703. FIG. 9 shows at 901 shows a link node scroller 803 which is positions on a different area of links 805. Link node scrollers may be placed on links regardless of the orientation of the links. FIG. 10 shows at 1001 how a link node scroller 803 may be used with links to nodes that are displayed in horizontal rows, while FIG. 11 shows at 1101 how a link slider may be used with links to nodes that are displayed in vertical rows.

Figure 12:
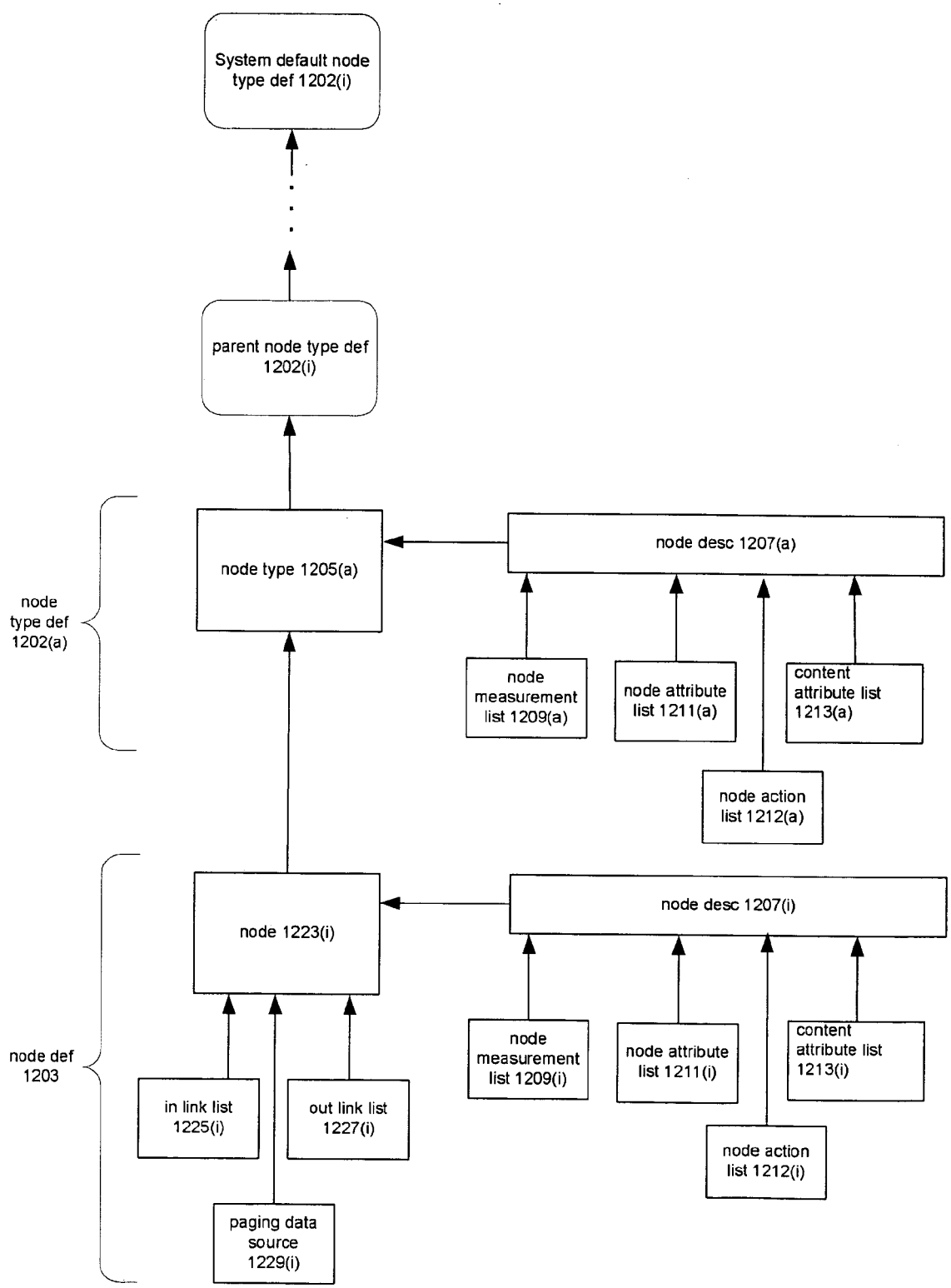
FIG. 12 shows the data structure used to represent a node scroller in a preferred embodiment.

Representing Node Scrollers. FIG. 12

In a preferred embodiment, the nodes and node parts are objects that are defined using the well-known Java™ programming environment. A feature of the Java programming environment is that it permits one object to contain a reference to another object. Thus, a node part object that is defined for a node object may contain a reference to the node object. FIG. 12 shows the Java objects which define a node in a preferred embodiment. The arrows in FIG. 12 indicate associations between the objects making up the definitions. Definitions 1201 include a node type definition 1202 which defines the type of a set of nodes and a node definition 1203 for a node belonging to the node type definition. Beginning with node type definition 1202, node type object 1205 represents a node type. As shown by the node type defs 1202(*a*, *i*, and *d*), node types are hierarchical. Descendants of a node type inherit the attributes of the ancestor, but the attributes may be modified in the descendant. At the top of the hierarchy is a system-defined default node type which may also be modified. If no node type is specified for a node when a node is created, the node gets the default node type.

Included in node type definition 1202(*a*) is node description object 1207(*a*), which is associated with node type object 1205(*a*) and describes the appearance of nodes having the node type represented by node type object 1205(*a*). Four lists are associated with a node description 1207: node measurement list 1209, which is a list of the current physical measurements of the node's display, node attribute list 1211, which is a list of user-defined attributes such as color which apply to the entire displayed node, content attribute list 1213, which has an entries for content attributes belonging to nodes of the node type defined by node type object 1205(*a*), and node action list 1212, which associates actions that may be performed in response to user inputs with the node.

Node definition 1203 defines a node that belongs to a given node type. The node is represented by node object 1223(*i*), which is associated with node type object 1205(*a*). Node object 1223(*i*) has associated with it a node description 1207(*i*). When the node corresponding to node object 1213(*i*) is created, it inherits its node description from the node description belonging to its node type. Thus, node object 1223(*i*) inherits its node description 1207(*i*) from node description 1207(*a*). The node measurements, node attributes, and content attributes associated with a given node object may be modified for that object. Copies of the modified attributes are associated with the node; attributes that are unmodified are obtained from the node type from which they were inherited. For example, where the content attributes include run-time values, copies of these values would be made for the content attribute list for the node when the node was created or the values were updated. Each node object 1223 further has a paging data source object 1229 which describes the current state of the node scroller associated with the object and lists of the links connecting the node object to other nodes; there are two types of links; in links, running from another node to this node, specified in link list 1225, and out links, running from this node to another node, specified in out link list 1227. Out link list 1227 thus specifies a node's children and is used to locate the nodes specified by the node scroller.

Figure 13:
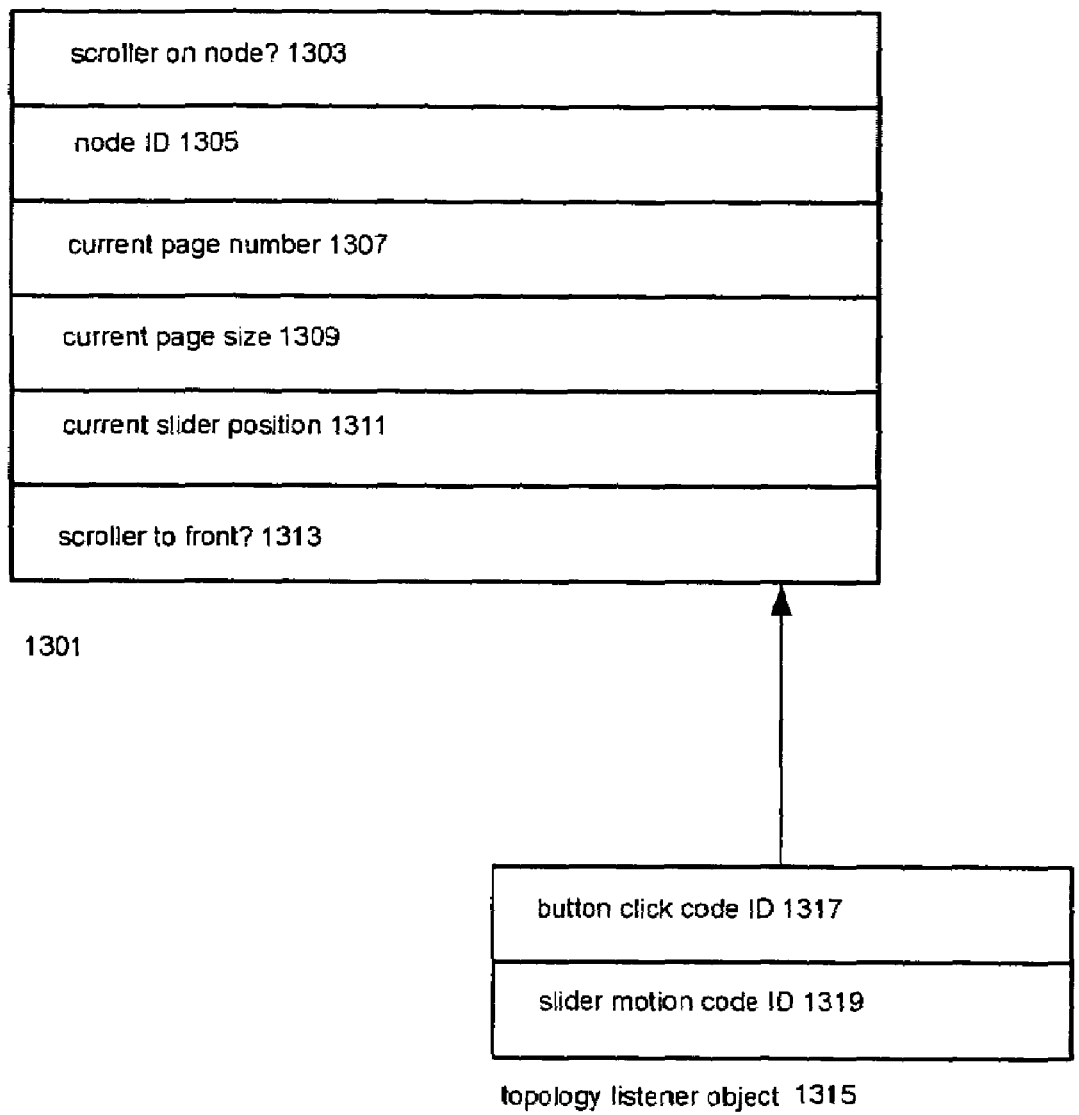
FIG. 13 shows details of the data structure 1229 of FIG. 12.

Details of Paging Data Source Object 1229. FIG. 13

FIG. 13 shows details of a presently-preferred embodiment of paging data source object 1229. Paging data source object 1229 is created when node object 1223 is created. Object 1229 is shown in detail at 1301. Object 1301 contains a node ID 1305 which identifies the node object to which the node scroller belongs. The rest of the data items in object 1301 indicate the current state of the node scroller. The value of scroller on node? field 1303 indicates whether the scroller is a parent node scroller or a link node scroller. current page number 1307 indicates the page number of the page of child nodes 607 that is currently being displayed. current page size 1309 indicates the number of child nodes that are currently contained in a full page of child nodes. In some cases, object 1301 will contain a current slider position value 1311 which indicates the current position of slider 705 in scrollbar 703. scroller to front? 1313 is meaningful only of the node scroller is a parent node scroller. In that cases, scroller to front? indicates whether the node scroller is being displayed in front of or behind its node. As will be explained in more detail, an application programmer's interface (API) permits an application program to set and read fields 1303, 1307, and 1309. In a preferred embodiment, scroller on node? field 1303 and current page size field 1309 are implemented as static variables whose values apply to all of the nodes in the graph. In other embodiments, these fields may be implemented as per-node variables. In similar fashion, object 1229 may contain a static variable or a per-node variable which indicates the position of a link node scroller on the parent node's links and the API may permit setting and reading the position.

A topology listener object 1315 may be associated with object 1229. The topology listener object 1315 specifies code that is to be performed in response to user mousing inputs concerning the node scroller. button click code ID 1317 specifies actions to be performed when a user clicks on either button 611 or button 613 of the second embodiment or on an arrow 305 of the first embodiment. slider motion code ID 1319 specifies actions to be performed when a user moves slider 705 in the second embodiment.

The button click code in the first embodiment is executed in response to a click on a paging arrow by incrementing or decrementing the current page number as indicated by the arrow direction and displaying the next or previous page of child nodes. The link data items in out link list 1227 are used to locate the child nodes to be displayed. In the second embodiment, what happens depends on whether the node scroller is a parent node scroller, as determined by the value of field 1303. When the node scroller is not a parent node scroller, the click works as described above for the first embodiment. When the node scroller is a parent node scroller, what happens depends on the value of field 1313. If field 1313 indicates that the parent node scroller is in front of the parent node, the click works as described above for the first embodiment, except that the position of slider 705 in the scroll bar is also changed to correspond to the position of the page of children being displayed in the set of pages.

The slider motion code is executed in the second embodiment whenever a user employs the mouse to drag the slider along the scrollbar. As the slider is dragged, the code computes the relationship between the current position of the slider in the scrollbar and the pages of children and displays the page that corresponds to the current position. When the slider motion stops, the value for the current page number in field 1307 is set to the page corresponding to the current position of the slider. In other embodiments, the current position of the slider may be mapped to a particular child node and the page size may be used to determine how many nodes on each side of the particular child node are to be displayed. In such an embodiment, object 1301 will include field 1311 and the field will contain the current position of the slider.

The API for Node Scrollers: FIGS. 14-16

In the presently-preferred embodiment, an API written in the well-known Java programming language is available to create and manipulate paging data source objects 1229. This API is shown in FIGS. 14-16. Beginning with FIG. 14, the description of the API has the following parts: the name of the interface at 1407 and any parameters which it requires at 1409. At 1411, the function performed by the interface is explained; at 1413, what the interface returns is described. The API shown in FIG. 14 is the API for creating a paging data source object and for creating a topology event listener object 1315. The API for creating a paging data source object has two forms: one for simply creating an instance of a paging data source when a node is created, shown at 1401, and one, shown at 1403, which is used when a node is automatically created on demand, shown at 1403. The DataProvider parameter specifies a source for the data that will be displayed via the node being created on demand. FIG. 14 also shows the API for creating a topology listener. The TopologyObject parameter is an object which implements the user-level interfaces for nodes and links. In the second embodiment, the listener responds to movement of the slider in the node scroller's scrollbar as well as clicking on the arrow buttons.

FIG. 15 shows the API for getting page number, page size, and scroller type information for a node scroller from paging data source 1229 and for determining whether a parent node scroller is in front of its node. getPageNumber 1501 takes a node ID as a parameter, locates the paging data source 1229 for the node, and returns the value of current page number 1307. getPageSize 1503 returns the value of current page size 1309. getPagingArrowStyle 1505 returns the current value of scroller on node field 1313, which indicates whether the node scroller is a parent node scroller or a link node scroller. hasPagingArrowsAdded 1507 takes a node ID as a parameter, locates the paging data source 1229 for the node, and returns the Boolean value TRUE if the node scroller is a parent node scroller, as indicated by the value of field 1303, and has been activated, and therefore is in front of the parent node, as indicated by the value of field 1313. When an interface sets or reads a static variable, no node identifier is required in the interface.

FIG. 16 shows the API for setting the page number, page size, and scroller type. setPageNumber 1601 sets current page number field 1307; setPageSize 1603 does the same with regard to current page size field 1309, and setPagingArrowStyle 1605 does the same with regard to scroller on node field 1303. For details concerning parameters, see the discussion of FIG. 15.

CONCLUSION

The foregoing Detailed Description has described to those skilled in the relevant technologies how to make and use the inventions described herein and has further disclosed the best mode presently known to the inventors of making and using their inventions. It will be immediately apparent to those skilled in the relevant technologies that there are many possible implementations of the principles of the invention. For example, the components of the node scroller can take many forms and many locations relative to the parent and child nodes are possible. For instance, a parent node scroller may be located next to the parent node instead of on it and a link node scroller may be located on the side of the displayed child nodes that is away from the links to the parent. The kinds of inputs to the node scroller may vary. For example, a single click or double click may be used with the up or down arrows and any kind of input or visual device which indicates a position on a scroll bar may be used as well as a slider. Some implementations may only permit movement through the child nodes by page increments, while other implementations may not employ pages at all. Accordingly, some node scrollers may have only scrollbars, while others may have only up and down arrows.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. Apparatus for displaying a set of child nodes of a parent node in a display belonging to an interactive display device, the apparatus comprising:
   a node scroller associated with the parent node in the display; and
   a list of the child nodes in memory accessible to the interactive display device, the interactive display device using a user input to the node scroller and the list of child nodes to determine a set of child nodes and displaying the determined set,
   wherein the node scroller is displayed on the parent node and a scrollbar of the node scroller becomes visible on the parent node when a mouse action occurs on the parent node, or the node scroller is displayed across links connecting child nodes of the set to the parent node.

2. The apparatus set forth in claim 1 wherein:
   the user input specifies a position in the list; and
   the determined set is child nodes in the list that are in the neighborhood of the position.

3. The apparatus set forth in claim 2 wherein:
   the node scroller includes a scrollbar; and
   the user input specifies the position by specifying a position on the scrollbar.

4. The apparatus set forth in claim 3 wherein:
the node scroller includes a slider on the scroll bar; and
the user input specifies the position on the scrollbar by moving the slider to the position.

5. The apparatus set forth in claim 2 wherein:
the list is divided into pages of child nodes; and
the determined set is child nodes in the page that contains the position.

6. The apparatus set forth in claim 5 wherein:
the node scroller includes a page selector that selects a page of the child nodes; and
the user input is an input to the page selector.

7. The apparatus set forth in claim 6 wherein:
the pages of the child nodes have a sequence; and
the page selector selects a previous or next page in the sequence relative to a current page of the sequence.

8. The apparatus set forth in claim 7 wherein the page selector comprises:
a previous page selector that selects a previous page relative to the current page; and
a next page selector that selects a next page relative to the current page.

9. The apparatus set forth in claim 8 wherein:
the previous page selector includes an up arrow; and
the next page selector includes a down arrow.

10. The apparatus set forth in claim 8 wherein:
the node scroller further includes a scrollbar; and
the user input specifies the page by specifying a position on the scrollbar.

11. The apparatus set forth in claim 10 wherein:
the node scroller further includes a slider on the scroll bar; and
the user input specifies the position on the scrollbar by moving the slider to the position.

12. The apparatus set forth in claim 10 wherein:
the previous page selector and the next page selector are displayed on the parent node and
the scrollbar is displayed on the parent node in response to a mouse action on the parent node.

13. The apparatus set forth in claim 6 wherein:
the input to the page selector is a mouse click on the page selector.

14. The apparatus set forth in claim 5 wherein:
the node scroller further includes a scrollbar; and
the user input specifies the page by specifying a position on the scrollbar.

15. The apparatus set forth in claim 14 wherein:
the node scroller includes a slider on the scroll bar; and
the user input specifies the position on the scrollbar by moving the slider to the position.

16. The apparatus set forth in claim 1 wherein:
the node scroller is displayed in the vicinity of the parent node.

17. The apparatus set forth in claim 1 wherein:
the node scroller is displayed in the vicinity of the displayed child nodes.

18. The apparatus set forth in claim 1 wherein:
the display produced by the apparatus has a center of interest; and
the apparatus displays nodes belonging to a level of a hierarchy such that nodes in the level are arranged in a row and the nodes in the row that are in the center of interest do not overlap and the nodes in the row that are not in the center of interest overlap.

19. A memory device that is characterized in that:
the memory device contains code which, when executed, implements the interactive display device set forth in claim 1.

20. Apparatus for displaying a set of child nodes of a parent node in a display belonging to an interactive display device, the apparatus comprising:
a node scroller associated with the parent node in the display; and
a list of the child nodes in memory accessible to the interactive display device, the interactive display device using a user input to the node scroller and the list of child nodes to determine a set of child nodes and displaying the determined set,
wherein the user input specifies a position in the list, and the determined set is child nodes in the list that are in the neighborhood of the position,
wherein the node scroller includes a scrollbar, and the user input specifies the position by specifying a position on the scrollbar,
wherein the node scroller is displayed on the parent node, and the scrollbar becomes visible on the parent node when a mouse action occurs on the parent node.

21. Apparatus for displaying a set of child nodes of a parent node in a display belonging to an interactive display device, the apparatus comprising:
a node scroller associated with the parent node in the display; and
a list of the child nodes in memory accessible to the interactive display device, the interactive display device using a user input to the node scroller and the list of child nodes to determine a set of child nodes and displaying the determined set,
wherein the user input specifies a position in the list, and the determined set is child nodes in the list that are in the neighborhood of the position,
wherein the node scroller includes a scrollbar, and the user input specifies the position by specifying a position on the scrollbar,
wherein the node scroller is displayed across links connecting child nodes of the set to the parent node.

22. Apparatus for displaying a set of child nodes of a parent node in a display belonging to an interactive display device, the apparatus comprising:
a node scroller associated with the parent node in the display; and
a list of the child nodes in memory accessible to the interactive display device, the interactive display device using a user input to the node scroller and the list of child nodes to determine a set of child nodes and displaying the determined set,
wherein the user input specifies a position in the list, and the determined set is child nodes in the list that are in the neighborhood of the position,
wherein the list is divided into pages of child nodes, and the determine set is child nodes in the page that contains the position,
wherein the node scroller includes a page selector that selects a page of the child nodes, and the user input is an input to the page selector,
wherein the pages of the child nodes have a sequence, and the page selector selects a previous or next page in the sequence relative to a current page of the sequence,
wherein the page selector comprises a previous page selector that selects a previous page relative to the current page, and a next page selector that selects a next page relative to the current page, wherein the previous page selector and the next page selector are displayed on the parent node.

23. Apparatus for displaying a set of child nodes of a parent node in a display belonging to an interactive display device, the apparatus comprising:
a node scroller associated with the parent node in the display; and
a list of the child nodes in memory accessible to the interactive display device, the interactive display device using a user input to the node scroller and the list of child nodes to determine a set of child nodes and displaying the determined set,
wherein the user input specifies a position in the list, and the determined set is child nodes in the list that are in the neighborhood of the position,
wherein the list is divided into pages of child nodes, and the determine set is child nodes in the page that contains the position,
wherein the node scroller includes a page selector that selects a page of the child nodes, and the user input is an input to the page selector,
wherein the pages of the child nodes have a sequence, and the page selector selects a previous or next page in the sequence relative to a current page of the sequence,
wherein the page selector comprises a previous page selector that selects a previous page relative to the current page, and a next page selector that selects a next page relative to the current page,
wherein the previous page selector and the next page selector are displayed above and below a set of links connecting the displayed child nodes to the parent node.

24. Apparatus for displaying a set of child nodes of a parent node in a display belonging to an interactive display device, the apparatus comprising:
a node scroller associated with the parent node in the display; and
a list of the child nodes in memory accessible to the interactive display device, the interactive display device using a user input to the node scroller and the list of child nodes to determine a set of child nodes and displaying the determined set,
wherein the user input specifies a position in the list, and the determined set nodes in the list that are in the neighborhood of the position,
wherein the list is divided into pages of child nodes, and the determine set is child nodes in the page that contains the position,
wherein the node scroller includes a page selector that selects a page of the child nodes, and the user input is an input to the page selector,
wherein the pages of the child nodes have a sequence, and the page selector selects a previous or next page in the sequence relative to a current page of the sequence,
wherein the page selector comprises a previous page selector that selects a previous page relative to the current page, and a next page selector that selects a next page relative to the current page,
wherein the node scroller further includes a scrollbar, and the user input specifies the page by specifying a position on the scrollbar,
wherein the node scroller is displayed on links connecting displayed child nodes to the parent node, and the previous page selector, the next page selector, and the scrollbar are displayed across the links.

25. The apparatus set forth in claim 24 wherein:
the scrollbar is displayed between the previous page selector and the next page selector.

26. A method of displaying a set of child nodes of a parent node in a display, the method being practiced in an interactive display device and comprising the steps of:
receiving a user input to a node scroller, the node scroller being associated with the parent node in the display;
employing the user input and a list of the child nodes in memory accessible to the display device to determine a set of the child nodes; and
responding to the user input by displaying the determined set of child nodes in the display, wherein the node scroller is displayed on the parent node and a scrollbar of the node scroller becomes visible on the parent node when a mouse action occurs on the parent node or the node scroller is displayed across links connecting child nodes of the set to the parent node.

27. The method set forth in claim 26 wherein:
in the step of receiving a user input, the user input specifies a position in the list; and
the step of employing the user input uses the position to determine a set of child nodes that are in the neighborhood of the position.

28. The method set forth in claim 27 wherein:
the node scroller includes a scrollbar; and
the user input specifies the position by specifying a position on the scrollbar.

29. The method set forth in claim 28 wherein: the node scroller includes a slider on the scrollbar; and the user input specifies the position on the scrollbar by moving the slider to the position.

30. The method set forth in claim 28 wherein the method further comprises the steps of:
receiving a mouse action on the parent node; and
responding thereto by displaying the scrollbar on the parent node.

31. The method set forth in claim 27 wherein:
the list is divided into pages of child nodes; and
in the step of employing the user input, the determined set is child nodes in the page that contains the position.

32. The method set forth in claim 31 wherein:
the node scroller includes a page selector that selects a page of the child nodes; and
in the step of receiving the user input, the user input is an input to the page selector.

33. The method set forth in claim 32 wherein:
the pages of the child nodes have a sequence; and
in the step of receiving the user input, the determined set is child nodes belonging to a previous or next page in the sequence relative to a current page of the sequence.

34. The method set forth in claim 33 wherein:
the page selector includes a previous page selector and a next page selector; and
in the step of receiving the user input, when the user input is from the previous page selector, the determined set is child nodes belonging to the previous page and when the user input is from the next page selector, the determined set is child nodes belonging to the next page.

35. The method set forth in claim 34 wherein:
the node scroller further includes a scrollbar; and
in the step of receiving the user input, when the user input is from the scrollbar, the determined set is child nodes belonging to the page that contains the position specified by the user input from the scrollbar.

36. The method set forth in claim 35 wherein:
the display device further displays a slider on the scrollbar; and
the user input specifies the position on the scrollbar by moving the slider to the position.

37. The method set forth in claim 32 wherein:
in the step of receiving the user input, the user input is a mouse click on the page selector.

38. The method set forth in claim 31 wherein:
the node scroller further includes a scrollbar; and
in the step of receiving the user input, the user input specifies a position on the scrollbar; and
in the step of employing the user input, the position on the scrollbar specifies the page.

39. The method set forth in claim 38 wherein:
the node scroller includes a slider on the scrollbar; and
the user input specifies the position on the scrollbar by moving the slider to the position.

40. The method set forth in claim 26 wherein:
the node scroller is displayed in the vicinity of the parent node.

41. The method set forth in claim 26 wherein:
the node scroller is displayed in the vicinity of the displayed child nodes.

42. The method set forth in claim 26 further comprising the step of:
displaying the determined set of child nodes as nonoverlapping nodes in a row of nodes that includes overlapping child nodes of a sibling of the parent node.

43. A memory device that is characterized in that:
the memory device contains code which, when executed, implements the method set forth in claim 26.

44. A method of displaying a set of child nodes of a parent node in a display, the method being practiced in an interactive display device and comprising the steps of:
receiving a user input to a node scroller, the node scroller being associated with the parent node in the display;
employing the user input and a list of the child nodes in memory accessible to the display device to determine a set of the child nodes; and
responding to the user input by displaying the determined set of child nodes in the display,
wherein in the step of receiving a user input, the user input specifies a position in the list, and the step of employing the user input uses the position to determine a set of child nodes that are in the neighborhood of the position,
wherein the node scroller includes a scrollbar, and the user input specifies the position by specifying a position on the scrollbar,
wherein the node scroller is displayed across links connecting child nodes of the set to the parent node.

45. A method of displaying a set of child nodes of a parent node in a display, the method being practiced in an interactive display device and comprising the steps of:
receiving a user input to a node scroller, the node scroller being associated with the parent node in the display;
employing the user input and a list of the child nodes in memory accessible to the display device to determine a set of the child nodes; and
responding to the user input by displaying the determined set of child nodes in the display,
wherein in the step of receiving a user input, the user input specifies a position in the list, and the step of employing the user input sues the position to determine a set of child nodes that are in the neighborhood of the position,
wherein the list is divided into pages of child nodes, and in the step of employing the user input, the determine set is child nodes in the page that contains the position,
wherein the node scroller includes a page selector that selects a page of the child nodes, and in the step of receiving the user input, the user input is an input to the page selector,
wherein the pages of the child nodes have a sequence, and the step of receiving the user input, the determined set is child nodes belonging to a previous or next page in the sequence relative to a current page of the sequence,
wherein the page selector includes a previous page selector and a next page selector, and in the step of receiving the user input, when the user input is from the previous page selector, the determined set is child nodes belonging to the previous page and when the user input is from the next page selector, the determined set is child nodes belonging to the next page,
wherein the display device displays the previous page selector and the next page selector on the parent node.

46. A method of displaying a set of child nodes of a parent node in a display, the method being practiced in an interactive display device and comprising the steps of:
receiving a user input to a node scroller, the node scroller being associated with the parent node in the display;
employing the user input and a list of the child nodes in memory accessible to the display device to determine a set of the child nodes; and
responding to the user input by displaying the determined set of child nodes in the display,
wherein in the step of receiving a user input, the user input specifies a position in the list, and the step of employing the user input sues the position to determine a set of child nodes that are in the neighborhood of the position,
wherein the list is divided into pages of child nodes, and in the step of employing the user input, the determine set is child nodes in the page that contains the position,
wherein the node scroller includes a page selector that selects a page of the child nodes, and in the step of receiving the user input, the user input is an input to the page selector,
wherein the pages of the child nodes have a sequence, and in the step of receiving the user input, the determined set is child nodes belonging to a previous or next page in the sequence relative to a current page of the sequence,
wherein the page selector includes a previous page selector and a next page selector, and in the step of receiving the user input, when the user input is from the previous page selector, the determined set is child nodes belonging to the previous page and when the user input is from the next page selector, the determined set is child nodes belonging to the next page,
wherein the display device displays the previous page selector and the next page selector above and below a set of links connecting the displayed child nodes to the parent node.

47. A method of displaying a set of child nodes of a parent node in a display, the method being practiced in an interactive display device and comprising the steps of:
receiving a user input to a node scroller, the node scroller being associated with the parent node in the display;
employing the user input and a list of the child nodes in memory accessible to the display device to determine a set of the child nodes; and
responding to the user input by displaying the determined set of child nodes in the display,
wherein in the step of receiving a user input, the user input specifies a position in the list, and the step of employing the user input sues the position to determine a set of child nodes that are in the neighborhood of the position,
wherein the list is divided into pages of child nodes, and in the step of employing the user input, the determine set is child nodes in the page that contains the position, wherein the node scroller includes a page selector that selects a page of the child nodes, and in the step of receiving the user input, the user input is an input to the page selector, wherein the pages of the child nodes have a sequence, and in the step of receiving the user input, the determined set is child nodes belonging to a previous or next page in the sequence relative to a current page of the sequence, wherein the page selector includes a previous page selector and a next page selector, and in the step of receiving the user input, when the user input is from the previous page selector, the determined set is child nodes belonging to the previous page and when the user input is from the next page selector, the determined set is child nodes belonging to the next page, wherein the node scroller further includes a scrollbar, and in the step of receiving the user input, when the user input is from the scrollbar, the determined set is child nodes belonging to the page that contains the position specified by the user input from the scrollbar, wherein the display device displays the previous page selector and the next page selector on the parent node, and the method further comprises the steps of: receiving a mouse action on the parent node, and responding thereto by displaying the scrollbar on the parent node.

48. A method of displaying a set of child nodes of a parent node in a display, the method being practiced in an interactive display device and comprising the steps of:

receiving a user input to a node scroller, the node scroller being associated with the parent node in the display;

employing the user input and a list of the child nodes in memory accessible to the display device to determine a set of the child nodes; and responding to the user input by displaying the determined set of child nodes in the display, wherein in the step of receiving a user input, the user input specifies a position in the list, and the step of employing the user input sues the position to determine a set of child nodes that are in the neighborhood of the position, wherein the list is divided into pages of child nodes, and in the step of employing the user input, the determine set is child nodes in the page that contains the position, wherein the node scroller includes a page selector that selects a page of the child nodes, and in the step of receiving the user input, the user input is an input to the page selector, wherein the pages of the child nodes have a sequence, and in the step of receiving the user input, the determined set is child nodes belonging to a previous or next page in the sequence relative to a current page of the sequence, wherein the page selector includes a previous page selector and a next page selector, and in the step of receiving the user input, when the user input is from the previous page selector, the determined set is child nodes belonging to the previous page and when the user input is from the next page selector, the determined set is child nodes belonging to the next page, wherein the node scroller further includes a scrollbar, and in the step of receiving the user input, when the user input is from the scrollbar, the determined set is child nodes belonging to the page that contains the position specified by the user input from the scrollbar, wherein the display device displays the node scroller on links connecting displayed child nodes to the parent node, and the previous page selector, the next page selector, and the scrollbar are displayed across the links.

49. The method set forth in claim 48 wherein:

the display device displays the scrollbar between the previous page selector and the next page selector.

50. Apparatus for displaying a set of child nodes of a parent node in a display belonging to an interactive display device, the apparatus comprising:

a node scroller associated with the parent node in the display, the node scroller including
  a previous page selector,
  a next page selector, and
  a scrollbar that is located between the previous page selector and the next page selector and has a slider; and a list of the child nodes in memory accessible to the interactive display device, the list being divided into a sequence of pages and the interactive display responding in the alternative to an input to the previous page selector by selecting the child nodes on the previous page relative to a current page as the set of child nodes, to an input to the next page selector by selecting the child nodes on the next page relative to the current page as the set of child nodes, or to an input which moves the slider by selecting child nodes in the neighborhood of a position in the list that corresponds to the position of the slider as the set of child nodes and thereupon displaying the selected set, wherein the node scroller is displayed on the parent node and the scrollbar becomes visible on the parent node when a mouse action occurs on the parent node, or the node scroller is displayed across links connecting child nodes of the set to the parent node.

* * * * *

UNITED STATES PATENT AND TRADEMARK OFFICE
CERTIFICATE OF CORRECTION

| | | |
|---|---|---|
| PATENT NO. | : 7,421,665 B2 | Page 1 of 1 |
| APPLICATION NO. | : 11/029519 | |
| DATED | : September 2, 2008 | |
| INVENTOR(S) | : Molesky et al. | |

Figure 2:
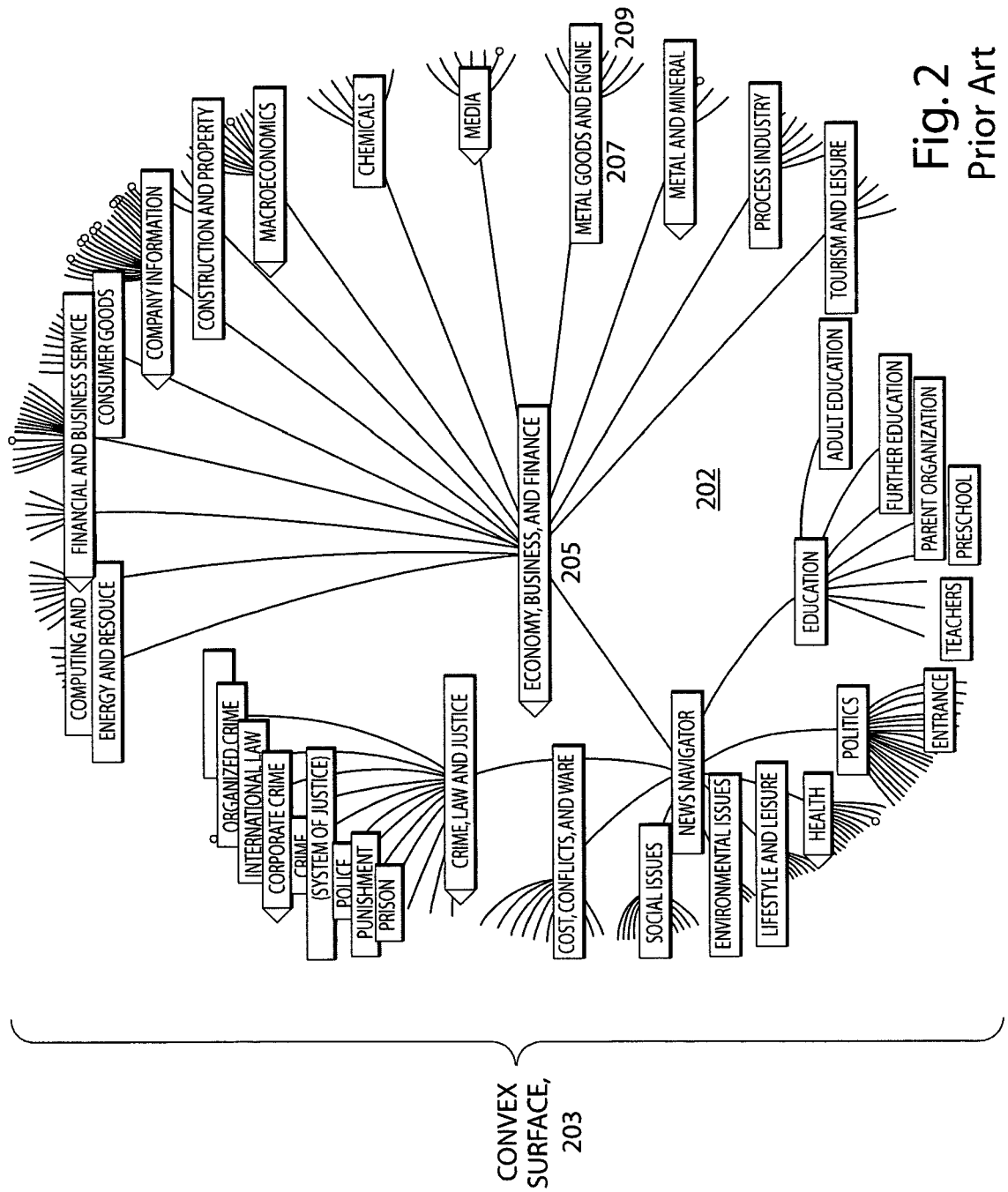
FIG. 2 shows a prior-art technique for displaying a large graph.

It is certified that error appears in the above-identified patent and that said Letters Patent is hereby corrected as shown below:

On Drawing sheet 2 of 16, in Figure 2, line 2, delete "RESOUCE" and insert -- RESOURCE --, therefor.

In column 1, line 64, delete "product." and insert -- product --, therefor.

In column 4, line 43, delete "Scrollers." and insert -- Scrollers: --, therefor.

In column 5, line 31, delete "Scrollers." and insert -- Scrollers: --, therefor.

In column 6, line 24, delete "1229." and insert -- 1229: --, therefor.

In column 6, line 41, delete "scroller to front?" and insert -- scroller to front? 1313 --, therefor.

In column 11, line 43, in claim 24, delete "set nodes" and insert -- set is child nodes --, therefor.

In column 14, line 1-2, in claim 45, delete "and the" and insert -- and in the --, therefor.

Signed and Sealed this

Sixteenth Day of March, 2010

David J. Kappos
*Director of the United States Patent and Trademark Office*